United States Patent [19]

Phillips

[11] Patent Number: 5,566,491

[45] Date of Patent: Oct. 22, 1996

[54] METHOD AND APPARATUS FOR ANIMATING A FLOATING WATERFOWL DECOY

[76] Inventor: Richard J. Phillips, Rt. 1, Box 366, 9816 NW. 171 Terr., Alachua, Fla. 32615

[21] Appl. No.: 324,964

[22] Filed: Oct. 18, 1994

[51] Int. Cl.⁶ .................................................. A01M 31/06
[52] U.S. Cl. .................................. 43/3; 446/155; 446/163
[58] Field of Search .............................. 43/3, 2; 119/253, 119/254, 263, 256, 250; 446/176, 193, 197, 198, 155, 159, 163

[56] References Cited

U.S. PATENT DOCUMENTS

| | | | |
|---|---|---|---|
| 1,292,618 | 1/1919 | Lazelle | 43/42.22 |
| 1,893,000 | 1/1933 | Ranney | 43/42.22 |
| 2,101,646 | 12/1937 | Gordon, Jr. | 446/163 |
| 2,227,242 | 12/1940 | Boutin | 43/3 |
| 2,674,065 | 4/1954 | Sprinkle | 446/159 X |
| 2,909,859 | 10/1959 | Christmas | 43/3 |
| 3,034,245 | 5/1962 | Lynch | 43/3 |
| 4,082,063 | 4/1978 | Strickland | 119/254 |
| 4,699,829 | 10/1987 | Willinger | 119/256 X |
| 4,776,127 | 10/1988 | Jackson | 119/263 X |

FOREIGN PATENT DOCUMENTS

| | | | |
|---|---|---|---|
| 548793 | 10/1956 | Italy | 446/198 |

OTHER PUBLICATIONS

1994–1995 Michigan Hunting and Trapping Guide, Michigan Dep't of Natural Resources, Wildlife Division, 1994, p. 26.

U.S. PTO Disclosure Document 353394, Dated Apr. 29, 1994.

*Primary Examiner*—J. Elpel
*Attorney, Agent, or Firm*—Bookstein & Kudirka

[57] ABSTRACT

An animating device is attached underneath a floating waterfowl decoy that creates rings, ripples, and waves on the water surface emanating from said decoy giving the appearance that said decoy is alive. In accordance with one embodiment of the device, a long, flexible plastic tube is attached or retrofit to the keel of an existing floating decoy. An apparatus, such as a motor driven pump, a pressurized air cylinder, or a hand- or foot-operated bellows air pump supplies air to the tube and a one-way check valve is provided in the end of tube attached to the decoy to prevent water from back-filling the long flexible plastic tube. Air forced through the long flexible plastic tube bubbles out underneath the decoy and the rising bubbles create rings, ripples, and waves on the water surface to give the appearance that the decoy is alive. In another embodiment, the tube is attached to flexible container mounted under the decoy. Air entering the container causes it to expand and tilt the decoy which create rings, ripples, and waves on the water surface to give the appearance that the decoy is alive.

17 Claims, 5 Drawing Sheets

METHOD AND APPARATUS FOR ANIMATING A FLOATING WATERFOWL DECOY

FIELD OF THE INVENTION

This invention relates, in general, to artificial, floating duck, geese, and/or other waterfowl decoys, and, in particular, to the animation of waterfowl decoys to give the appearance that the artificial decoy is alive.

BACKGROUND OF THE INVENTION

The average waterfowl hunter owns one or more artificial decoys which are placed near where the hunter will be hunting to attract wild ducks, geese, and/or other waterfowl close enough for the hunter to shoot them. The vast majority of the decoys available for the hunter to purchase are stationary, meaning they do not move and do not appear to be moving. Traditional floating decoys "just sit there" and do nothing except perhaps being moved around by the wind and/or water currents. On calm days, watching the decoys "move" is about as exciting as watching grass grow—wild waterfowl find it just as interesting.

Over the years, it seems that wild waterfowl have become wise to man's attempts to lure them close enough to be shot and have learned to stay away from anything that does not look like a real waterfowl.

The average duck hunter quickly learns by experience that wild waterfowl often land very close to other live ducks, geese, and/or other waterfowl—much closer on average than they will land to artificial decoys. Wild ducks, geese, and other waterfowl are also much more likely to land near artificial decoys if one or more live waterfowl such as cranes, loons, etc. are swimming or walking amongst the decoys.

As the use of live captive waterfowl for the purpose of decoying wild waterfowl is strictly forbidden by law, hunters have been forced to become increasingly more creative in their methods to lure the wild waterfowl in close enough to shoot at. Therefore, if a duck, goose, or other waterfowl decoy can be made to look and act more like it is real, then the chances of luring wild waterfowl closer to the hunter will be improved.

In the past, hunters hunting in flooded forests for waterfowl would agitate or "kick" the water surface when they saw waterfowl flying close by. The wild waterfowl occasionally mistake the rings, ripples, and waves on the water surface as coming from other live wild waterfowl and fly in to land close enough for the hunter to shoot them. This method works well in areas with lots of cover for the hunter to hide behind, but does not work well in open water such as on lakes, ponds, and streams.

Various mechanical methods have been devised to animate artificial decoys and make them look lifelike. Several U.S. Patents have been issued for innovative use of pull strings connected between the decoy and the hunter which are used to flap wings, rock the decoy back/forth and side/side, rotate the head, and tilt the head down to the water to wet the beak or submerge the head. An example of one of the earliest patents is a decoy with wings that flap when a cord is pulled which is disclosed in U.S. Pat. No. 74,458 to Wales. A disadvantage of pull strings is that the hunter must move to pull the string which the waterfowl can often easily see and avoid. The decoy usually must also be staked or attached to a rigid object in order to operate acceptably.

Waterfowl decoys with internal electronic game calls have been invented, but have been outlawed for use while hunting (for example, see 1994–1995 Michigan Hunting and Trapping Guide, published by the Michigan Department of Natural Resources, pg. 26). Decoys with mechanically-driven pneumatic calls have been invented as disclosed in U.S. Pat. Nos. 1,110,245 and 1,185,559 both to Vaughan. The disclosed devices also incorporate a mechanically-driven propeller to simulate a swimming action. One disadvantage of these devices is that it is difficult to make the quacking sound lifelike. There are also other disadvantages as discussed below.

Several other patents have been awarded for motorized decoys with simulated swimming and moving body parts such as feet, flapping wings, swishing tail, bobbing head, etc. Typical examples are disclosed in U.S. Pat. Nos. 636,106 to Biddle and 4,612,722 to Ferrell. There have even been disclosures of remote-controlled motorized decoys such as disclosed in U.S. Pat. Nos. 3,689,927 to Boston and 5,289,654 to Denny. Motorized decoys have the disadvantage that either mechanical or electrical power must be provided to the drive motor. Hence, one must often wind-up the decoy or replace the battery. Additionally, swimming decoys propelled by a motor-driven propeller can easily get "stuck" if the propeller gets stopped with a weed or stick and, accordingly, these devices don't work well in very shallow water. The motors and gears also often make so much noise that the wild ducks, geese, and/or other waterfowl can readily hear them operating. These devices also tend to be very expensive. They also require lots of maintenance, for example to dry out the devices in order to prevent rusting. Use of remote-controlled devices is not recommended in rain, fog, and heavy dew situations. Finally, several of these mechanical and electronic devices are now being outlawed for use while hunting (for example, see 1994–1995 Michigan Hunting and Trapping Guide, pg. 26). Devices that can't be readily turned off can also be mistaken as real by the hunter's bird dog and are then retrieved by the dog instead of the hunter's actual kill.

A device to create ripples on the surface of the water by using a submerged, battery-operated, motor-driven propeller is disclosed in U.S. Pat. No. 4,375,337 to Yerger. As with the motorized decoys discussed above, this device is prone to weed clogging, requires battery recharging, and requires maintenance to prevent rusting. This device is typically also placed and operated such that the ripples do not emanate directly from any of the close-by decoys, and therefore does not provide a realistic decoy motion.

Various inflatable artificial decoys have been invented to provide life-like motion. For example, disclosed in U.S. Pat. No. 2,341,028 to Fay is a tethered balloon decoy that is moved up/down by a pull string. The problem with this decoy is that it must be filled with a lighter than air gas such as helium. Disclosed in U.S. Pat. No. 1,673,479 to Christmas is a toy that has an internal balloon that is inflated and then allowed to exhaust the air to move the toy on the water surface. The disadvantage of this device is that it requires frequent catching and refilling with air. It's also noisy.

A pressure bulb connected by a long tube to the decoy has been used to cause the decoy to quack when the pressure bulb is squeezed such as disclosed in U.S. Pat. No. 2,546,189 to Keep. Similar pressure bulb mechanisms have been developed to cause the decoy's wings to flap while quacking such as disclosed in U.S. Pat. Nos. 2,227,242 to Boutin and 2,909,859 to Christmas, and to cause movement of the decoy's head while quacking such as disclosed in U.S. Pat. No. 3,034,245 to Lynch. The main disadvantage of quacking decoys is that it is real difficult to tune them to sound lifelike. Decoys with air-actuated wing, head, tail, etc. movement are also quite expensive and can not be readily retrofit to existing decoys. The simulated movement is also not very lifelike.

Accordingly, with the use of modern plastics technology, it is an object of the present invention to provide an inexpensive, simple to use, low-maintenance device that can be readily retrofit to existing, floating waterfowl decoys to provide realistic motion of said decoys, the operation of which does not readily give away the hunter's location.

The purpose of the present invention is to lure more live waterfowl significantly closer to the hunter to increase the number of waterfowl that the hunter can shoot at, kill, and accordingly bag.

Another purpose of the present invention is to reduce the number of wounded and needlessly killed waterfowl that do not die immediately because the hunter took a "long shot," but instead either fly off or swim off and die where the hunter cannot find them.

SUMMARY OF THE INVENTION

The foregoing problems are solved and the foregoing purposes are achieved in illustrative embodiments of the invention in which a decoy animating device is located directly underneath floating duck, geese, and/or other waterfowl decoys to create rings, ripples, and waves on the water surface to give the appearance that the decoy is alive.

In one embodiment of the invention, the decoy animating device comprises an apparatus for supplying air to a long, flexible plastic tube that is attached or retrofit to the keel of an existing floating decoy. The air can be supplied by either a motor driven pump, a pressurized air cylinder, or a hand- or foot-operated bellows air pump. A one-way check valve is provided in the end of tube attached to the decoy to prevent water from back-filling the long flexible plastic tube. Air is forced through the long flexible plastic tube and bubbles out underneath the decoy. The rising bubbles create rings, ripples, and waves on the water surface to give the appearance that the decoy is alive. Rising bubbles do not alarm wild waterfowl because it is a normal occurrence in nature that bubbles rise from weeds and decaying vegetation on the bottom of the lake or stream, especially when waterfowl are feeding. In fact, the swimming action of live waterfowl tends to dislodge the bubbles allowing them to rise to the surface. The long flexible plastic tube is also ideally suited to easy decoy retrieval after the days hunting is done.

In another embodiment of the invention, the bubbling device is attached to the keel of an existing floating decoy and pointed to the rear of the decoy such that the bubbles exiting from the long flexible plastic tube can be used to propel the decoy across the water surface, thereby providing an appearance that the decoy is swimming.

In another embodiment of the invention, the bubbling device is attached to the keel of an existing floating decoy and pointed downwards below the decoy such that if pulsating air flow is provided, for example by a hand, or foot, operated bellows air pump, the decoy is rocked side-side and/or bobbed up - down thereby creating additional motion of the decoy.

In still another embodiment of the present invention, the bubbling device can be attached to one end of a telescopic post, the other end of the post is inserted into the bottom lake or stream, such that bubbles rise to the surface of the water and create rings, ripples, and waves on the water surface to give the appearance that the decoys in the area are alive.

In yet another embodiment of the present invention, a hermetic decoy tilting system is attached to an existing floating decoy with expandable hand-operated bellows on one end of the long flexible plastic tube, and a flexible bag is sealed to the other end. Squeezing the hand-operated bellows transfers air through the long flexible plastic tube to the flexible bag underneath the decoy, which causes it to expand. When the hand-operated bellows is released the air is automatically sucked back through the long flexible plastic tube to the hand-operated bellows. The expansion and contraction of the flexible bag underneath the decoy causes the decoy to tip side to side and to rise and fall slightly in the water, which in turn creates rings, ripples, and waves on the water surface to give the appearance that the decoy is alive.

BRIEF DESCRIPTION OF THE DRAWINGS

The above and further advantages of the invention may be better understood by referring to the following description in conjunction with the accompanying drawings, in which.

DETAILED DESCRIPTION OF THE PREFERRED EMBODIMENTS

Figure 1:
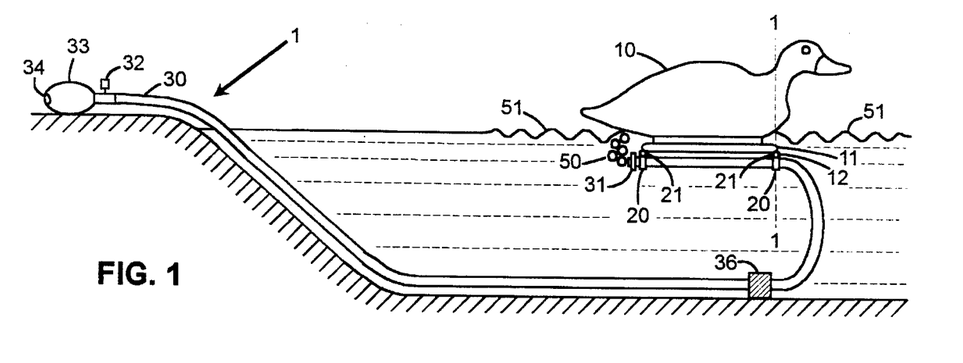
FIG. 1 is a side view of a decoy-mounted bubbling tube constructed in accordance with the present invention.

FIG. 1 shows the novel bubbling tube system 1 that can be retrofit to an existing floating decoy 10. Said floating decoy 10 can be a duck decoy, goose decoy, or any other waterfowl decoy. A long flexible plastic tube 30 is secured to the decoy's keel 11 by plastic cable clamps 20 with bolts and nuts 21 inserted through existing eyelets 12 molded into keel 11. Rubber ball or bellows 33 provided with a suitable, quietly-operating check valve 34 and flow rate control valve 32 is connected on one end of the long flexible plastic tube 30. A check valve 31 is connected to the other end of the long flexible plastic tube 30 to prevent water draining back into the long flexible plastic tube 30. When the rubber ball or bellows 33 is compressed, air is forced through the long flexible plastic tube 30 and through the check valve 31. The air exits the check valve 31 in the form of bubbles 50 which rise to the surface of the water whereby rings, ripples, and waves 51 are generated which emanate from the decoy 10 and giving decoy 10 the appearance of being alive. The bubbles 50 also provide a force to propel the decoy 10 across the surface of the water. The amount of air forced through the long flexible plastic tube 30 by rubber ball or bellows 33 can be adjusted by manipulating the flow rate control valve 32. Anchor weight can be attached to the long flexible plastic tube 30 to anchor decoy in place.

Figure 2:
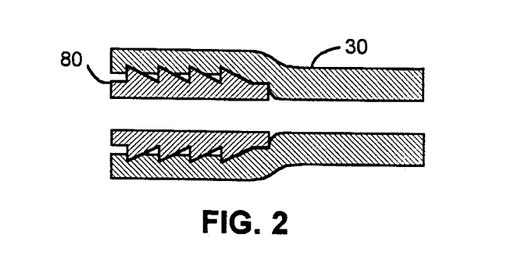
FIG. 2 is a sectional view of tubing connections of FIG. 1 made with conventional barbed fittings.

FIG. 2 shows how the flow rate control valve 32 and the check valve 31 are connected to the long flexible plastic tube 30 with conventional barbed fittings 80.

Figure 3A:
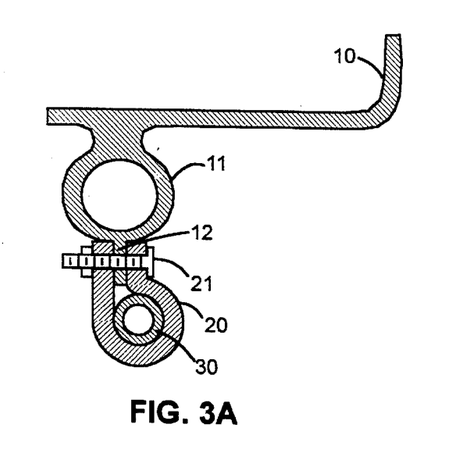
FIG. 3A is a sectional view along line 1—1 of the connection of the long flexible plastic tube of FIG. 1 to the underside of the decoy with cable clamps.

FIG. 3A shows how the long flexible plastic tube 30 is secured to the decoy's keel 11 by plastic cable clamps 20 with bolts and nuts 21 inserted through existing eyelets 12 molded into keel 11.

Figure 3B:
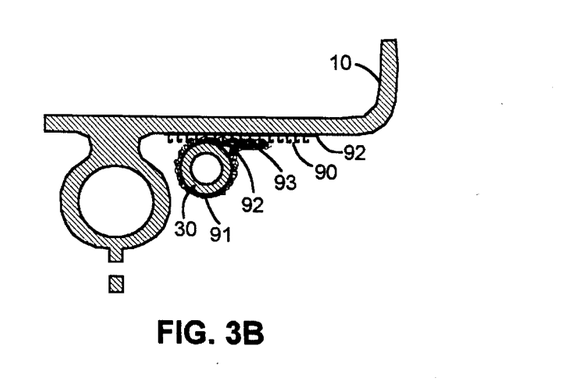
FIG. 3B is a sectional view of an alternative method of connection of the long flexible plastic tube of FIG. 1 to the underside of the decoy with "VELCRO" brand touch-fastener.

FIG. 3B shows an alternative method of attaching the long flexible plastic tube 30 to the underside of decoy 10 with "VELCRO" brand touch-fastener or similar material 90 and 91. The "hook" side of the "VELCRO" brand touch-fastener 90 is attached with adhesive 92 to the underside of decoy 10. The "loop" side of the "VELCRO" brand touch-fastener 91 is wrapped around the long flexible plastic tube 30 and attached with adhesive 92. Both ends 93 of the "VELCRO" brand touch-fastener 91 can be bonded together with adhesive 92. Stitching or staples (not shown) can also be used to join both ends 93 of "VELCRO" brand touch-fastener 91.

Figure 4:
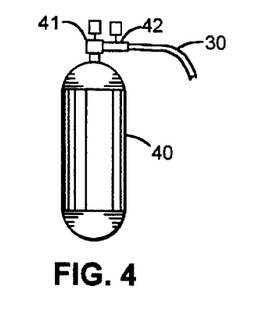
FIG. 4 depicts a pressurized air cylinder such as a scuba tank as the air source to the long flexible plastic tube of FIG. 1.

FIG. 4 depicts an alternative method of providing air to the long flexible plastic tube 30 with a pressurized air cylinder 40 equipped with control valve 41 and pressure regulator 42. Pressurized air cylinder 40 can be filled with air by any pressurized air source such as a tire pump at a gas station. With pressure regulator 42 properly adjusted, when control valve 41 is opened, a constant amount of air flow is provided to the long flexible plastic tube 30 thereby freeing the hunter's hands for duck calling and shooting at all times. Control valve 41 can be readily turned off when not needed to conserve air in the pressurized air cylinder 40. The pressure regulator 42 should have an over-pressure relief valve (not shown) such that excessive pressure can not be delivered to the long flexible plastic tubing 30.

Figure 5:
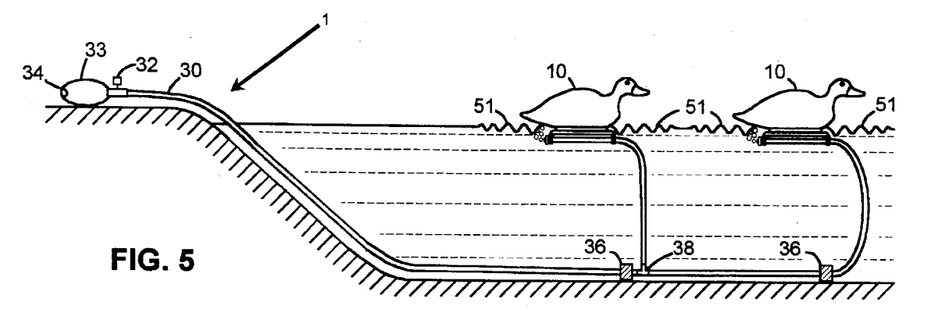
FIG. 5 is a side view of several decoys with bubbling tubes hooked up to a single air source.

FIG. 5 depicts an alternative embodiment of the novel bubbling tube system 1 where a second decoy 10 is connected to the long flexible plastic tube 30 by use of a barbed "T" connector 38. Additional decoys 10 can be readily added by using additional barbed "T" connectors 38. Bubbles 50 rise to the surface of the water whereby rings, ripples, and waves 51 are generated which emanate from each decoy 10 and thereby gives each decoy 10 the appearance of being alive.

Figure 6:
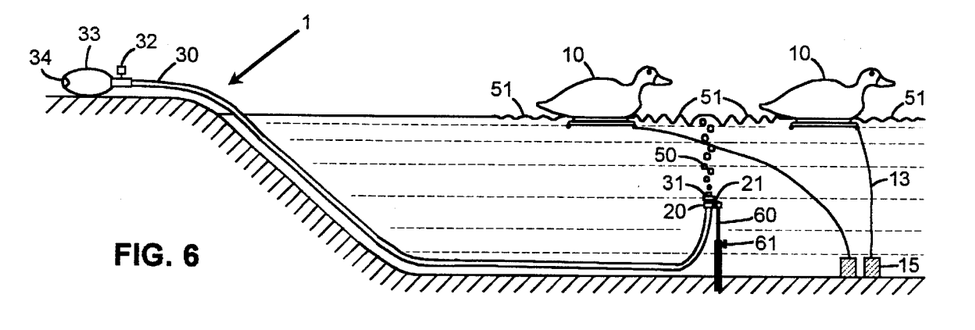
FIG. 6 is a side view of a post-mounted bubbling tube constructed in accordance with the present invention.
Figure 7:
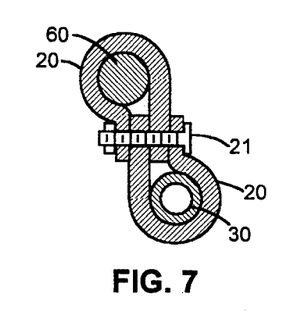
FIG. 7 is a sectional view along line 1—1 of the connection of the long flexible plastic tube to the telescoping stake of FIG. 6 with cable clamps.

FIG. 6 depicts an alternative embodiment where the long flexible plastic tube 30 is attached to a telescopic stake 60 by plastic cable clamps 20 with bolt and nut 21 inserted through the plastic cable clamps 20 as shown in greater detail in FIG. 7. The height of the telescopic stake 60 can be adjusted by with set screw 61. Bubbles 50 rise to the surface of the water whereby rings, ripples, and waves 51 are generated which emanate from the area directly above the telescopic post 60 thereby giving each nearby decoy 10 the appearance of being alive. The decoys 10 are conventionally anchored with anchor rope 13 tied at one end to the decoy 10 at eyelet 12 and the other end to anchor weight 15. In either very shallow or very deep water, the telescopic stake 60 may not be used in favor of anchoring the long flexible plastic tube 30 in place submerged below the decoys 10.

Figure 8:
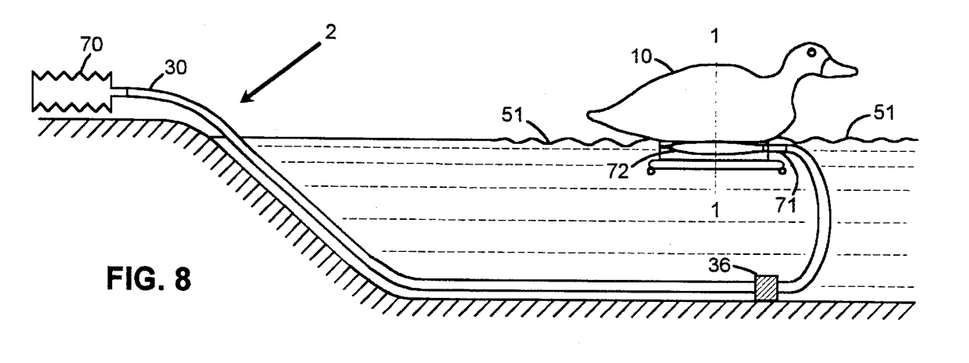
FIG. 8 is a side view of a decoy-mounted hermetic decoy-tilting embodiment.
Figure 9:
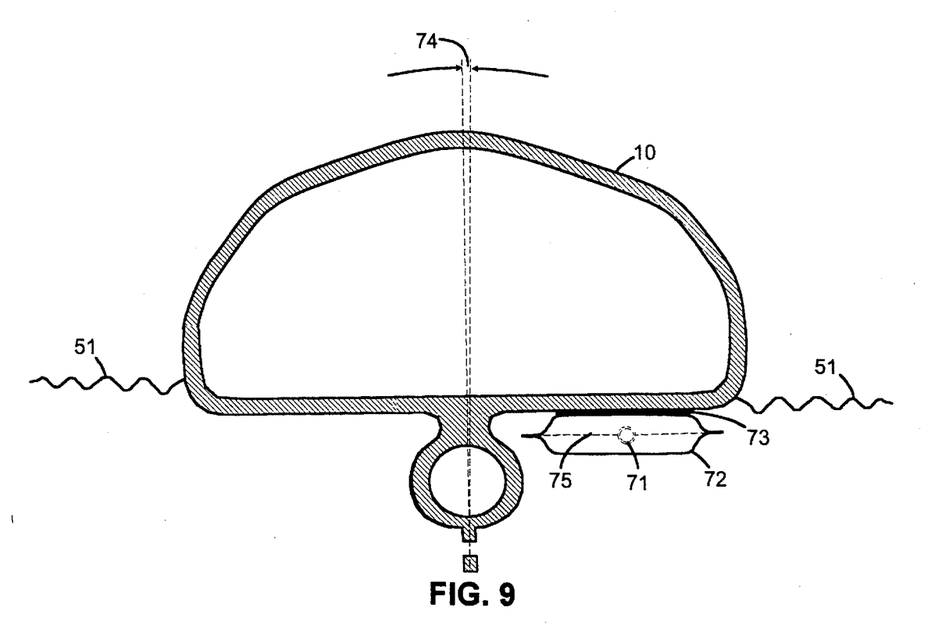
FIG. 9 is a sectional view along line 1—1 of the decoy-mounted hermetic decoy-tilting embodiment of FIG. 8 showing how the flexible bag tilts the decoy.
Figure 10:
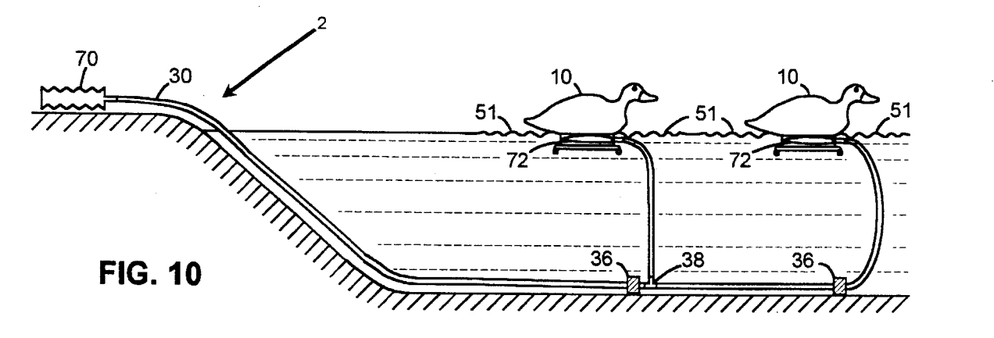
FIG. 10 is a side view of several decoys with a decoy-mounted hermetic decoy-tilting embodiment.

FIG. 8 depicts a novel hermetic decoy-tilting system 2 that can be retrofit to an existing floating decoy 10. A long flexible plastic tube 30 is hermetically connected on one end to a plastic accordion bellows 70. The other end of the long flexible plastic tube 30 is hermetically connected to barbed fitting 71 made of polypropylene that is hermetically heat sealed into a flexible bag 72. The flexible bag container comprises two thin polypropylene sheets heat sealed together about their perimeter and a tube connector constructed of a polypropylene material heat sealed into the perimeter. As depicted in FIG. 9, the flexible bag 72 is secured to the underside of the decoy 10 with "VELCRO" brand touch-fastener 73 or similar material. The flexible bag 72 can be made of multi-layer plastic films such as those used by the military for packaging of food. An example of a suitable film from which to construct the flexible bag 72 is film MRE#8359 manufactured by the American National Can Corporation. Both sides of the flexible bag are heat sealed together using conventional methods with the barbed fitting 71 along seal seam 75. When the plastic accordion bellows 70 is compressed, air is transferred by pressure into the flexible bag 72 thereby causing it to puff up. As depicted in FIG. 9, the puffing of the flexible bag 72 causes the decoy 10 to tilt an angle 74. When the plastic accordion bellows 70 is released, air is sucked back through the long flexible plastic tube 30 thereby causing the flexible bag 72 to collapse. The collapse of the flexible bag 72 causes the decoy 10 to tilt back to its normal position. The tilting motion of the decoy 10 generates rings, ripples, and waves 51 on the surface of the water which emanate from the decoy 10 and thereby gives decoy 10 the appearance of being alive. As depicted in FIG. 8 and FIG. 10, the decoy may be used singly or in groups of decoys connected by sections of the long flexible plastic tube 30. The decoy 10 can be anchored either with anchor weight 36 as depicted in FIG. 8 or conventionally with anchor rope 13 tied at one end to the decoy 10 at eyelet 12 and the other end to anchor weight 15 as depicted in FIG. 6.

An alternate method to manufacture the plastic accordion bellows 70 and the long flexible plastic tube 30 is to make them both out of the long flexible plastic tube. The bellows section can be made out of the tubing itself if approximately an eight-inch-long section of the tubing at one end of the long flexible plastic tube 30 made of a thermoplastic material such as polyvinyl-chloride (PVC) is sufficiently heated and pressurized such that the air inside the tube causes the heated section to permanently expand much like a glass blower makes bottles. The extreme end of the tube is then pinched and melted shut thereby sealing that end of the tube. The other end of the tube is attached to the flexible bag 72 as described above.

The foregoing description has been limited to specific embodiments of this invention. It will be apparent, however, that variations and modifications may be made by those skilled in the art to the disclosed embodiments of the invention, with the attainment of some or all of its advantages and without departing from the spirit and scope of the present invention. For example, air can be provided to the long flexible plastic tube 30 by a battery powered pump. The long-flexible tube 30 could be eliminated all together if the battery powered pump was directly incorporated into newly-manufactured decoys. In addition, a cord take-up device could be built into the decoy 10 and used to store the long flexible plastic tubing 30 when the device is not in use. The innovative devices disclosed herein may also be built directly into newly-manufactured decoys and can also be combined with movement of other parts of the decoy such as flapping wings, bobbing/turning head, swishing tail, paddling feet, etc. One skilled in the art would also recognize that pumped water could be used in place of pumped air.

What is claimed is:

1. An animating apparatus for use with a waterfowl decoy floating on a water surface, which apparatus can be hand-operated by a remotely-located hunter to give the decoy the appearance of being alive, the apparatus comprising:

a tube having a proximal end and a distal end with an opening therein, and a predetermined length;

means, attached to the proximal end of said tube, for providing an air flow to the proximal end of said tube; and means for attaching the distal end of said tube to an underside of said decoy such that the distal end of said tube is positioned proximate to the decoy and beneath the water surface such that the air provided by the providing means, flows from the opening of the distal end of said tube and produces air bubbles which generate rings, ripples and waves on the water surface near the decoy causing the decoy to appear alive, the attachment means being constructed so that the tube can be readily attached and detached from the decoy and comprising a touch-fastener strip attached to the underside of said decoy and a mating touch-faster strip attached to the tube such that the tube can be releasably attached to the decoy.

2. An animating apparatus for use with a water fowl decoy floating on a water surface above a bottom, which apparatus can be hand-operated by a remotely-located hunter to give the decoy the appearance of being alive, the apparatus comprising:

a stake having an adjustable length and means for attaching the stake to the bottom;

a tube having a proximal end and a distal end with an opening therein, and a predetermined length;

means, attached to the proximal end of said tube, end for providing an air flow to the proximal end of said tube; and means for attaching the distal end of said tube to the stake such that the distal end of said tube is positioned proximate to the decoy and beneath the water surface such that the air flow provided by the providing means, flows from the opening of the distal end of said tube and generates bubbles which, in turn, generate rings, ripples and waves on the water surface near the decoy causing the decoy to appear alive.

3. An animating apparatus for use with a first waterfowl decoy floating on a water surface above a bottom, which apparatus can be hand-operated by a remotely-located hunter to give the first decoy the appearance of being alive, the apparatus comprising:

a tube having a proximal end and a distal end with an opening therein, and a predetermined length;

means, attached to the proximal end of said tube for providing an air flow to the proximal end of said tube;

a first flexible container;.

means for attaching the first flexible container to an underside of the first decoy;

an anchor weight;

means for attaching the anchor weight to the tube to anchor the first decoy in place; and means for attaching the distal end of said tube to the first flexible container to permit air flow into and out of the first flexible container, such that the first flexible container is positioned proximate the first decoy and beneath the water surface such that the air flow provided by the providing means flows from the distal end of said tube and enters the first flexible container causes the first decoy to tilt and generate rings, ripples and waves on the water surface near the first decoy causing the first decoy to appear alive.

4. An animating apparatus for use with a first waterfowl decoy floating on a water surface above a bottom, which apparatus can be hand-operated by a remotely-located hunter to give the first decoy the appearance of being alive, the apparatus comprising:

a tube having a proximal end and a distal end with an opening therein, and a predetermined length;

means, attached to the proximal end of said tube for providing an air flow to the proximal end of said tube;

a first flexible container comprised of
two thin polypropylene sheets heat sealed together about their perimeter; and
a tube connector constructed of a polypropylene material heat sealed into the perimeter;

means for attaching the first flexible container to an underside of the first decoy; and means for attaching the distal end of said tube to the first flexible container to permit air flow into and out of the first flexible container, such that the first flexible container is positioned proximate the first decoy and beneath the water surface such that the air flow provided by the providing means flows from the distal end of said tube and enters the first flexible container causes the first decoy to tilt and generate rings, ripples and waves on the water surface near the first decoy causing the first decoy to appear alive.

5. A manual method for a remotely-located hunter to animate a waterfowl decoy floating on a water surface to give the decoy the appearance of being alive, the method comprising the steps of:

A. obtaining a flexible tube having a proximal and distal end and a sufficient length to extend from a location of the decoy to a location of the hunter;

B. providing an air flow to the tube proximal end; and

C. attaching the distal end to the underside of said decoy, the distal end having an opening and being positioned with respect to the decoy and beneath the water surface such that air bubbles flowing from the opening generate rings, ripples and waves on the water surface near the decoy causing the decoy to appear alive.

6. The method according to claim 5 wherein step C comprises the step of:

C1. positioning the opening relative to the decoy such that the air bubbles flowing from the opening propel said decoy across the water surface.

7. The method according to claim 5 wherein step C further comprises the step of:

C2. constructing the attachment means so that the tube can be readily attached and detached from the decoy.

8. The method according to claim 7 wherein step C2 comprise the steps of:

C2A. attaching a touch-fastener strip to the underside of said decoy; and

C2B. attaching a mating touch-fastener strip attached to the tube such that the tube can be releasably attached to the decoy.

9. The method according to claim 5 further comprising the steps of:

D. procuring an anchor weight; and

E. attaching the anchor weight to the tube to anchor the decoy in place.

10. The method according to claim 5 further comprising the step of:

F. attaching the tube simultaneously to at least two decoys such that each decoy generates its own rings, ripples, and waves on the surface of the water which emanate from each said decoy and give each said decoy the appearance of being alive.

11. A manual method for a remotely-located hunter to animate a waterfowl decoy floating on a water surface to give the decoy the appearance of being alive, the method comprising the steps of:

A. obtaining a stake having an adjustable length;

B. attaching the stake to the bottom;

C. obtaining a flexible tube having a proximal and distal end and a sufficient length to extend from a location of the decoy to a location of the hunter;

D. providing an air flow to the proximal end; and

E1 attaching the distal end to the stake, the distal end having an opening and being positioned with respect to the decoy and beneath the water surface such that air flowing from the opening generates bubbles which, in turn, generate rings, ripples and waves on the water surface near the decoy causing the decoy to appear alive.

12. A manual method for a remotely-located hunter to animate a waterfowl decoy floating on a water surface to give the decoy the appearance of being alive, the method comprising the steps of:

A. obtaining a flexible tube having a proximal and distal end and a sufficient length to extend from a location of the first decoy to a location of the hunter;

B. providing an air flow to the proximal end;

C. constructing a first flexible container; and

D. attaching the first flexible container to the underside of the first decoy; and E. attaching the distal end to the first flexible container to permit air flow into and out of the first flexible container, the first flexible container being positioned with respect to the first decoy and beneath the water surface such that air entering and leaving the first flexible container causes the first decoy to tilt and generate rings, ripples and waves on the water surface near the first decoy causing the first decoy to appear alive.

13. The method according to claim 12 wherein step D comprises the step of:

D1. attaching the first flexible container to the first decoy so that the first flexible container can be readily attached and detached from the first decoy.

14. The method according to claim 13 wherein step D1 comprises the steps of:

D1A. attaching a touch-fastener strip to the underside of the first decoy; and

D1B. attaching a mating touch-fastener strip to the first flexible container such that the first flexible container can be releasably attached to the first decoy.

15. The method according to claim 12 further comprising the steps of:

F. obtaining an anchor weight; and

G. attaching the anchor weight to the tube to anchor the first decoy in place.

16. The method according to claim 12 further comprising the steps of:

H. obtaining a second flexible container;

I. attaching the second flexible container to a second decoy; and

J. attaching the tube in parrallel simultaneously to the first flexible container and to the second flexible container such that each of the first decoy and the second decoy generates its own rings, ripples, and waves on the surface of the water which emanate from each decoy and give each decoy the appearance of being alive.

17. The method according to claim 12 wherein step C comprises the steps of:

C1. obtaining a first polypropylene sheet;

C2. obtaining a second polypropylene sheet and placing it against the first polypropylene sheet;

C3. inserting a tube connector constructed of a polypropylene material between the first and the second polypropylene sheets; and C4. heat sealing together the first and the second polypropylene sheets about their perimeter.

* * * * *